United States Patent [19]

Epars

[11] Patent Number: 4,700,096
[45] Date of Patent: Oct. 13, 1987

[54] HIGH SPEED SYNCHRONOUS MACHINE HAVING A ROTOR PROVIDED WITH MAGNETS ARRANGED FOR ORTHORADIAL MAGNETIC INDUCTION

[75] Inventor: Michel Epars, Montesson, France

[73] Assignee: Auxilec, Colombes, France

[21] Appl. No.: 830,817

[22] Filed: Feb. 19, 1986

[30] Foreign Application Priority Data

Feb. 28, 1985 [FR] France ................................. 85 02966
Feb. 7, 1986 [FR] France ................................. 86 01721

[51] Int. Cl.$^4$ ........................................... H02K 21/22
[52] U.S. Cl. .................................... 310/153; 310/156
[58] Field of Search ................. 310/152, 153, 156, 70, 310/70 A

[56] References Cited

U.S. PATENT DOCUMENTS

| | | |
|---|---|---|
| 2,043,010 | 6/1936 | Reis . |
| 2,907,903 | 10/1959 | Reijnst et al. ........................ 310/156 |
| 3,221,194 | 11/1965 | Blackburn ........................... 310/156 |
| 3,411,059 | 11/1968 | Kaiwa .............................. 310/156 X |
| 3,663,850 | 5/1972 | Phelon . |
| 4,101,371 | 7/1978 | Aggen . |
| 4,179,634 | 12/1979 | Burson ............................. 310/156 X |
| 4,445,062 | 4/1984 | Glaser ............................... 310/156 |
| 4,480,207 | 10/1984 | Miller et al. ....................... 310/156 |

FOREIGN PATENT DOCUMENTS

| | | |
|---|---|---|
| 94152 | 11/1983 | European Pat. Off. . |
| 2003568 | 1/1970 | Fed. Rep. of Germany . |
| 1317744 | 1/1963 | France . |
| 2519483 | 7/1983 | France . |

Primary Examiner—Donovan F. Duggan
Attorney, Agent, or Firm—Pollock, VandeSande & Priddy

[57] ABSTRACT

The synchronous machine comprises a rotor provided with permanent magnets arranged for orthoradial magnetic induction and which are disposed around the axis in such a way that two adjacent magnets have counter-direction inductions, pole-pieces deviating the said induction so that it becomes radial to the periphery and each of the pole-pieces being formed of half-poles separated by a split pin applying each of the half-poles against the adjacent magnet, and wherein each magnet and each half-pole is in a single block in axial direction, the edges of the flanges ensuring the cohesion in radial direction.

4 Claims, 3 Drawing Figures

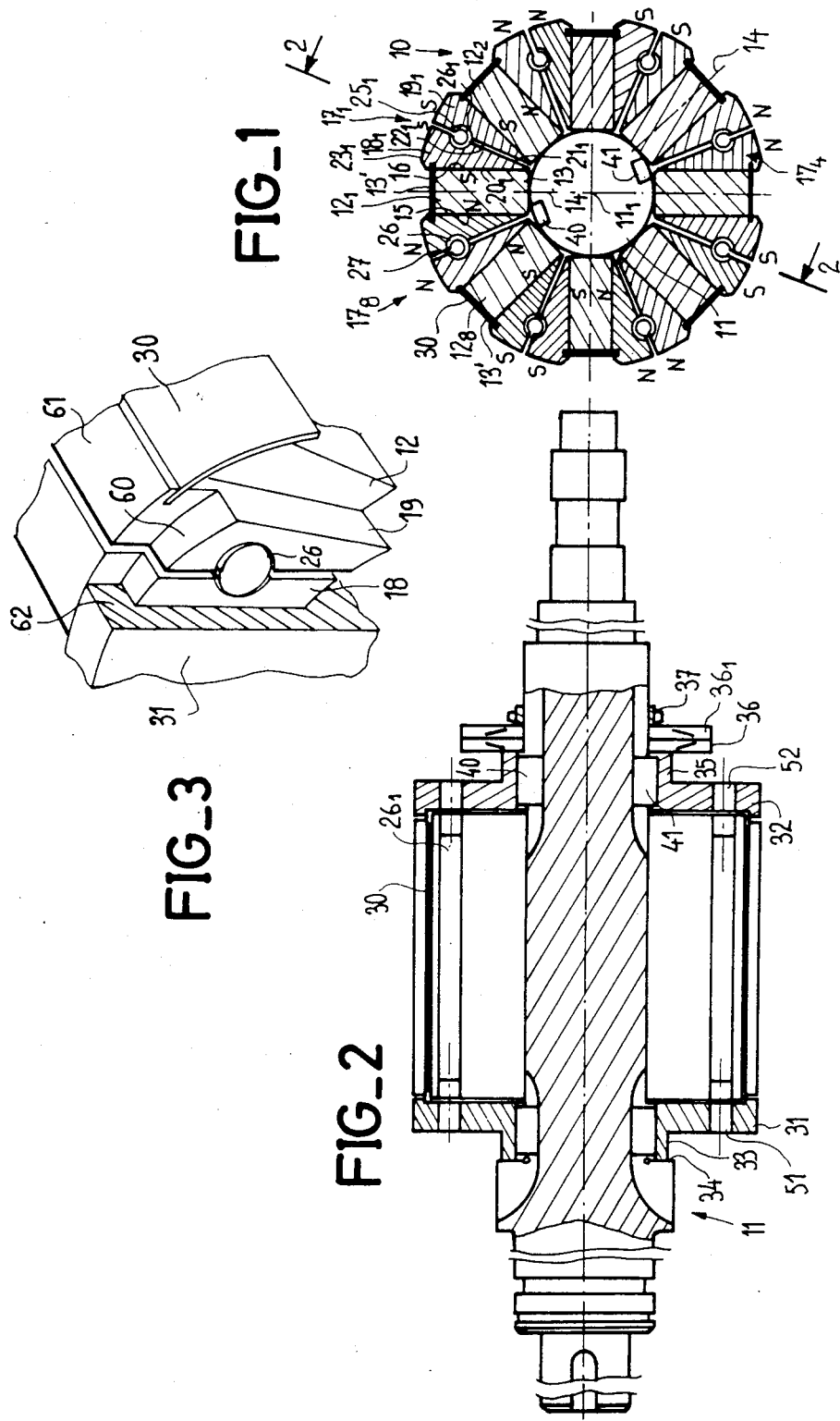

HIGH SPEED SYNCHRONOUS MACHINE HAVING A ROTOR PROVIDED WITH MAGNETS ARRANGED FOR ORTHORADIAL MAGNETIC INDUCTION

BACKGROUND OF THE INVENTION

Field of the Invention

The present invention concerns a high speed synchronous machine, preferably a motor, comprising a rotor constituted by permanent magnets the magnetic induction of which is tangential or orthoradial and by pole-pieces deviating this magnetic induction of the permanent magnets in order for said induction to be radial at the periphery.

A synchronous motor comprises a multiphase stator and a rotor provided with permanent magnets. The stator is supplied with a multiphase alternating current that generates a rotating field causing the rotation of the rotor.

For the manufacture of such rotors, use is increasingly being made of rare earth magnets, especially samarium-cobalt magnets, for example, $SmCo_5$, which present a low demagnetizing rate as well as a high magnetizing energy per volume unit, thereby allowing to obtain high mass torque motors, i.e. motors with a high torque in relation to a small mass. The drawback of such magnets is, however, that they present a relatively low remanent induction. This is the reason why these magnets are conventionally disposed in such a way that their magnetization is orthoradial and are associated to pole-pieces adapted to concentrate the flux, thereby allowing to confer upon the induction the radial direction in the air-gap. In this way, the two poles of each magnet are fully utilized.

This heterogeneous structure of the rotor raises mechanical cohesion problems that are more difficult to overcome as the speed of rotation increases. In order to improve this cohesion at very high speeds, of about 50 000 rpm, French patent published under No. 2 519 483 proposes a laminated rotor formed of a staggered stack, in the axial direction, of nonmagnetic disks for maintaining the magnets and which are crossed through by these magnets and magnetic plates in contact with the magnets, this stack being maintained in radial direction by bars crossing through the plates and the disks. Furthermore, in the rotor described in the above-mentioned French patent, each pole-piece between two adjacent magnets comprises two portions, the separation line running in the radial direction, and prestressed means are disposed between the two half pole-pieces so as to urge each of them against the corresponding magnet.

This rotor, which is particularly well adapted to high speeds, has, however, a complicated form and is expensive to produce.

SUMMARY OF THE INVENTION

The present invention aims at obtaining a rotor intended to rotate at high speeds, of about 15 000 rpm, which is of a simpler design and less expensive than that disclosed in the above-mentioned French patent.

It is characterized in that each magnet and each pole-piece is of a single block in the axial direction, and in that the cohesion in the radial direction is ensured by the edges of the two end flanges being applied against shoulders located at the ends of the pole-pieces. Furthermore, the means disposed between the two half pole-pieces for pressing each of them against one face of the adjacent magnet is constituted by a split pin. The rotor of the present invention is particularly simple and cheap to produce. Furthermore since the split pin acts as a spring, the slack is automatically adjusted, thereby increasing the allowances for the manufacture of the various components of the rotor and further reducing costs.

In order to reduce the risk of lack of balance, it is preferable that all the split pins be disposed in the same manner around the axis, for example, towards the outside of the rotor.

Since the rotor has to rotate at high speed, mounting is achieved in the following way: the rotor is caused to rotate at a speed higher than the maximal speed to which it will be subjected during working, then the rotor is impregnated with a polymerizable varnish that completes the cohesion of the various components of the rotor.

The present invention is, of course, in no way limited to producing a motor, but can also be utilized, for example, for the manufacture of an alternator. Neither is it limited to a particular material constituting the magnets. In another embodiment, these magnets can be made of ferrite.

BRIEF DESCRIPTION OF THE DRAWINGS

Other objects, features and advantages of the invention will become apparent from reading the following description of one of the embodiments, given with reference to the appended drawings in which:

FIG. 1 is a cross-section along a plane perpendicular to the axis of a rotor according to the invention;

FIG. 2 is a section along the line 2,2 of FIG. 1; and

FIG. 3 is a perspective view on a larger scale of a part of the end of the rotor represented in FIG. 1.

DETAILED DESCRIPTION OF THE DRAWINGS

In the example, the motor is of the autosynchronous type, sometimes known as a brushless direct current motor, with a multiphase stator (not represented) each winding of which is in series with a semi-conductor switch controlled by an electronic circuit in order that the torque be constant.

The rotor 10 comprises, uniformly distributed around the shaft 11, which is preferably made of a nonmagnetic material, eight magnets $12_1$, $12_2$, ... $12_8$ made of samarium-cobalt, each having the form of a rectangular parallelepiped extending parallel to the axis and which, in section, small sides 13 and 13' of tangential direction. Furthermore, the magnetization of each of these magnets 12 is orthoradial, i.e. also in tangential direction, parallel to the small side 13 and thus perpendicular to a corresponding radius 14. Therefore, the magnet $12_1$ has a face 15, perpendicular to the tangential face 13, constituting the north pole (N) and a face 16, which is parallel thereto, constituting the south pole (S).

The magnets are disposed in such a manner that the closest faces of two adjacent magnets have the same polarity. Thus each pole-piece disposed between two neighboring magnets presents a sole polarity. For example, the pole-piece $17_1$ between the magnets $12_1$ and $12_2$ constitutes a south pole.

Each pole-piece 17 is formed of two parts 18 and 19, made, for example, of mild steel and having an axial length slightly greater than that of the elements 12, as is seen in FIG. 3. The separation face between the two half poles 18, 19 is along a radial plane. Each half pole, 18 or 19, has in section through a plane perpendicular to the axis $11_1$, substantially the form of a rectangular triangle. Thus, the half-pole 18, has a face $20_1$ applied against the face 16 of the magnet $12_1$, a face $21_1$ opposite the corresponding face $22_1$ of the half-pole $19_1$ and an external face $23_1$ in the form of a zone of a cylinder constituting the external surface of the rotor.

Each of the faces $21_1$ and $22_1$ includes a groove in the form of a semi-cylinder having an axis parallel to the axis $11_1$ and they have the same radius. These grooves form a cylindrical recess $25_1$ within which is disposed a split pin $26_1$ formed of a split tube according to a generating line. The dimensions of the recess and of the split pin are such that the split pin is stress mounted so as to urge the half-pole $18_1$ against the magnet $12_1$ and the half-pole $19_1$ against the magnet $12_2$. After the final mounting operation, the faces $21_1$ and $22_1$ of the two half-poles $18_1$ and $19_1$ are separated by a space of about 1 mm.

In the preferred embodiment the split 27 of each pin is turned outwardly with respect to the stator to coincide with the space between half-poles.

It is preferable that each pin be made of a nonmagnetic material in order to reduce the transversal magnetic leaks due to the armature reaction.

Each half-pole 18, 19 extends in the radial direction beyond the external face 13' of each magnet 12. In the portion extending beyond the face 20, a groove of radial direction is provided for receiving a nonmagnetic wedging plate 30 applied against the face 13' of the magnet 12. Thus, the longitudinal edges, parallel to axis $11_1$, of the plate 30 are housed within the grooves of the half-poles at each side of the corresponding magnet 12.

In the axial direction, the magnets and the pole-pieces are maintained together by end flanges 31 and 32 (FIGS. 2 and 3) which includes holes 51, 52 free for providing passage for the pins in order to facilitate their mounting, on the one hand, and to allow the angular marking of the rotor, on the other hand.

The flange 31 is extended, opposite the assembly of the magnets and the pole-pieces 17, by a nose 33 resting upon a shoulder 34 of the shaft 11. The flange 32 is also extended by a nose 35, opposite the assembly of magnets and pole-pieces, against which abuts a flexible washer 36 urged by another washer $36_1$ and a nut 37 cooperating with a threaded part of the shaft. The washers 36 and $36_1$ allow to limit the axial stress upon the various elements of the rotor in order to prevent any deformation of the shaft and to limit the machining precision required in the production of the elements.

The flanges 31 and 32 are blocked in rotation upon the shaft by the wedges 40 and 41 diametrically opposite at the level of the north pole-pieces, respectively $17_8$ and $17_4$.

At the outer end each pole-piece 18, 19 extends in the axial direction beyond the magnet 12. Furthermore, at the outer ends, these pole-pieces are provided with a shoulder 60 forming a cylindrical surface having a diameter smaller than the diameter of the external surface 61 at the pole-pieces and closer to axis $11_1$ than the plate 30. These shoulders 60 cooperate with an edge 62 of the corresponding flange 31 in order to ensure the radial securement of the rotor.

Therefore, in operation, when the rotor rotates at high speed, the centrifugal force applies the magnets 12 against the plates 30 integral with the half pole-pieces 18, 19 that are maintained together in the radial direction due to the edges 62 of the flanges 31 and 32.

The split pins 26 constitute simple means for ensuring the cohesion of the rotor and which, furthermore, allows the adjustment of the slack. The marking of the angular position of the rotor due to the pins is particularly useful for an autosynchronous motor whose stator is supplied as a function of the angular position of the rotor.

As already mentioned herein-above, the opening of the splits in the same direction allows to limit the risks of lack of balance; furthermore, the opening towards the outside facilitates the control of the positions as from the periphery, and in particular from the split between the faces 21 and 22 of the two adjacent half pole-pieces.

Since the rotor has to rotate at high speed, the mounting operation is completed in the following manner: the rotor is driven at very high speed, higher than the maximal operating speed; then the rotor is subjected to a grease removing treatment and, finally, it is impregnated with a polymerizable varnish that thereafter heat hardened in order to complete the cohesion of the various elements of the rotor.

I claim:

1. A high speed synchronous machine rotor comprising:
   a plurality of magnets equally spaced circumferentially and angularly alternating with a plurality of poles, each pole including two half-pole pieces, adjacent radial faces of said half-pole pieces being spaced apart;
   means for restraining displacement of said poles and magnets in an axial direction;
   first means for restraining radial displacement of said poles and magnets, said first means including a split pin disposed in a recess formed in said adjacent faces of said half-pole pieces of each pole, said pin having a split positioned radially within the recess, said pin forcing angularly outward opposite faces of said half-pole pieces against said magnets thereby providing cohesion between the magnets and pole pieces of said rotor; and
   second radial restraining means including axially spaced flange members having continuous edges coacting with corresponding outwardly extending shoulders formed on said half pole-piece.

2. A rotor according to claim 1, further comprising third radial restraining means including a plate member positioned against radially outward faces of said magnets and grooves formed in said opposite faces of said half-pole pieces adjacent to said magnet for receiving opposite edges of said plate member.

3. A rotor according to claim 2 wherein said plate member is made of nonmagnetic material.

4. A high speed synchronous machine according to claim 3, wherein said recess is formed from mating semi-cylindrical grooves located in each said adjacent face.

* * * * *